Oct. 29, 1940.    B. L. SIMPSON    2,219,404
METHOD OF MAKING BATTERY PASTE
Filed July 12, 1938    4 Sheets-Sheet 1

INVENTOR
BRUCE L. SIMPSON.
BY Toulmin & Toulmin
ATTORNEYS.

Oct. 29, 1940.    B. L. SIMPSON    2,219,404
METHOD OF MAKING BATTERY PASTE
Filed July 12, 1938    4 Sheets-Sheet 2
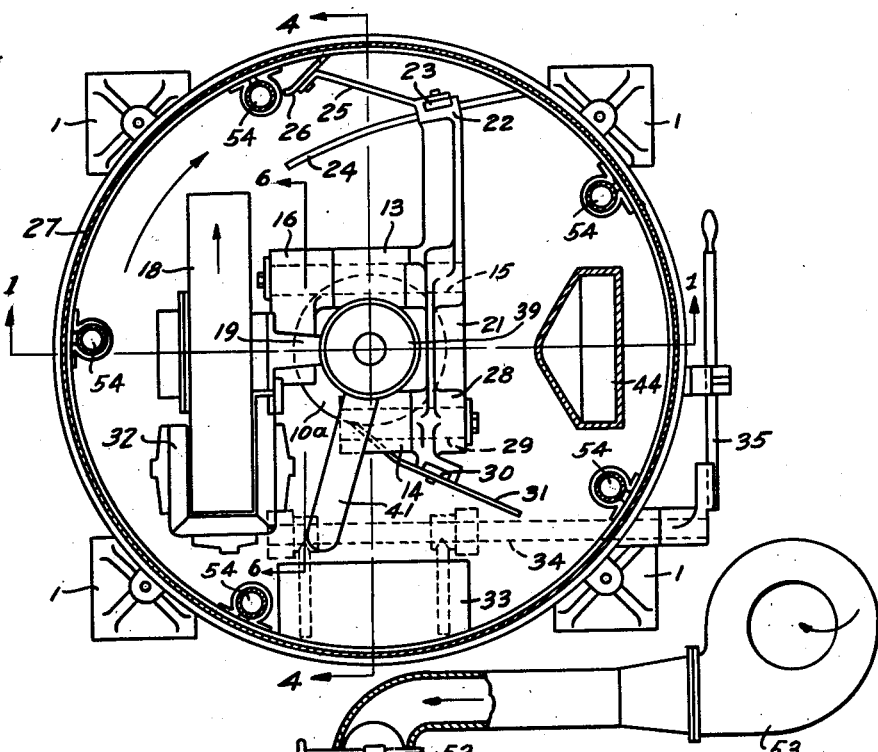
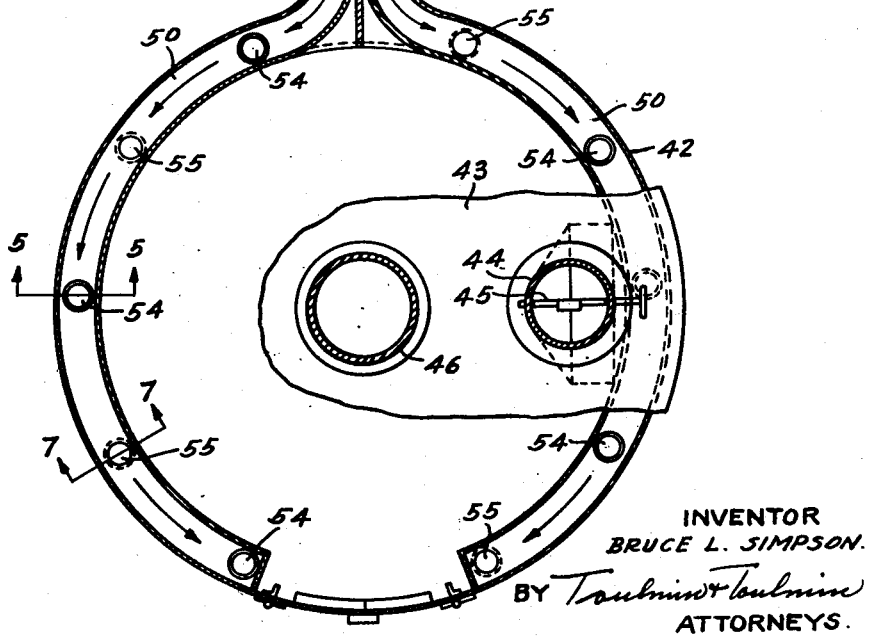
INVENTOR
BRUCE L. SIMPSON.
BY Toulmin & Toulmin
ATTORNEYS.

INVENTOR
BRUCE L. SIMPSON.
BY Toulmin & Toulmin
ATTORNEYS.

Oct. 29, 1940.  B. L. SIMPSON  2,219,404
METHOD OF MAKING BATTERY PASTE
Filed July 12, 1938      4 Sheets-Sheet 4

INVENTOR
BRUCE L. SIMPSON.
BY Toulmin + Toulmin
ATTORNEYS.

Patented Oct. 29, 1940

2,219,404

UNITED STATES PATENT OFFICE 2,219,404

METHOD OF MAKING BATTERY PASTE

Bruce L. Simpson, Chicago, Ill., assignor to Herbert S. Simpson, Chicago, Ill.

Application July 12, 1938, Serial No. 218,819

3 Claims. (Cl. 136—27)

My invention relates to a method of manufacturing pastes and the like and particularly in the mulling of pastes.

My invention relates to a method of mixing and mulling finely divided materials and of converting such materials into pastes. My invention relates to the control of the temperature of the mixture during mixing.

In particular, my invention relates to a method of manufacturing battery pastes for manufacturing battery plates.

It is an object of my invention to provide means for continuously mulling finely divided materials and at the same time adding to such materials as lead oxide suitable acid without injury to the mulling apparatus and simultaneously controlling the temperature of the mixture, the evacuation of the fine oxides and the like.

In the drawings:

Figure 2 is a section on the line 2—2, looking in the direction of the arrows, of Figure 1;

Figure 3 is a section on the line 3—3 of Figure 1, looking in the direction of the arrows;

Figure 1:
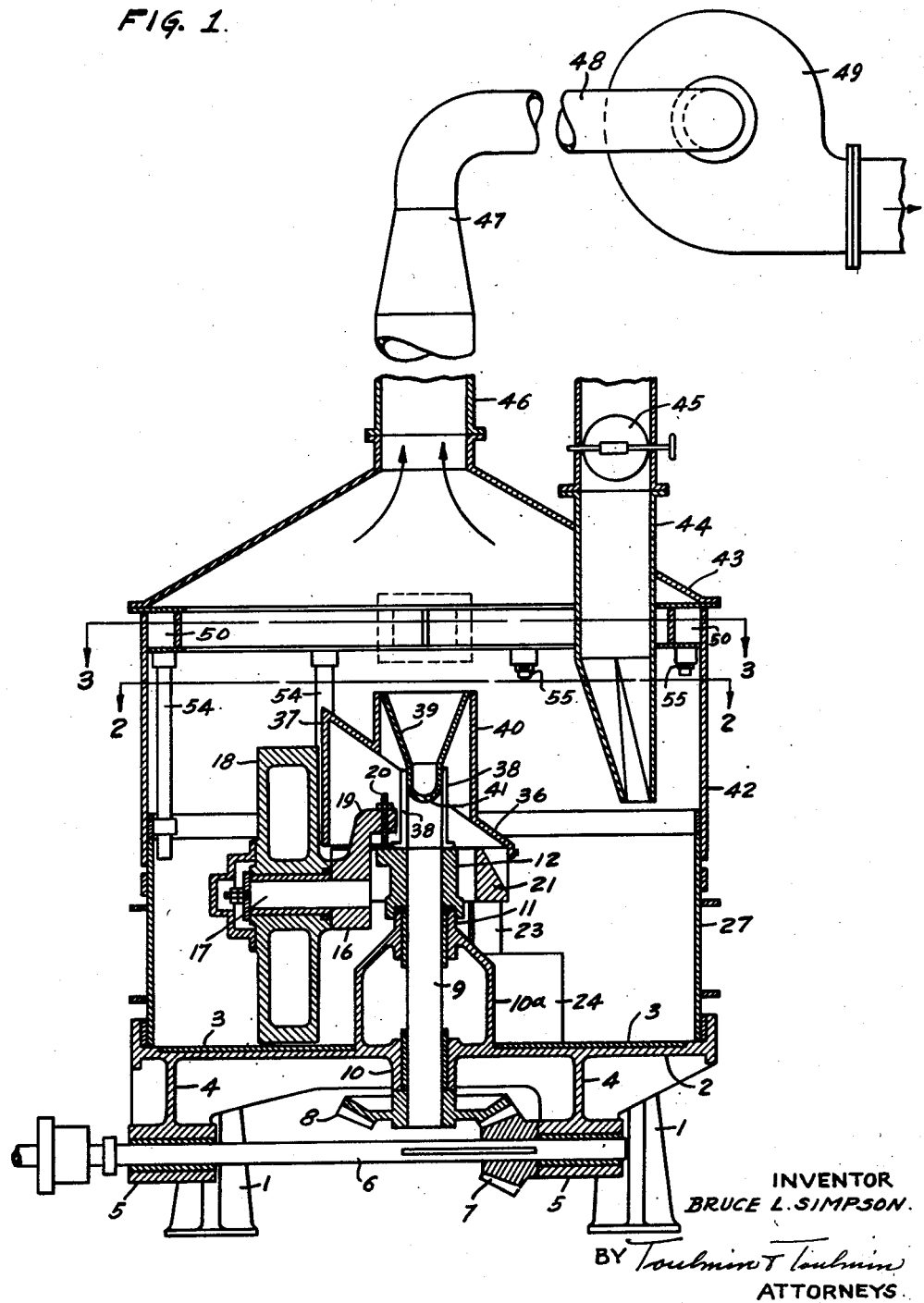
Figure 1 is a vertical section through the muller used in carrying out my invention, showing in full lines, a portion of the exhaust stack and blower. This view is taken on the section line 1—1 of Figure 2, looking in the direction of the arrows.
Figure 4:
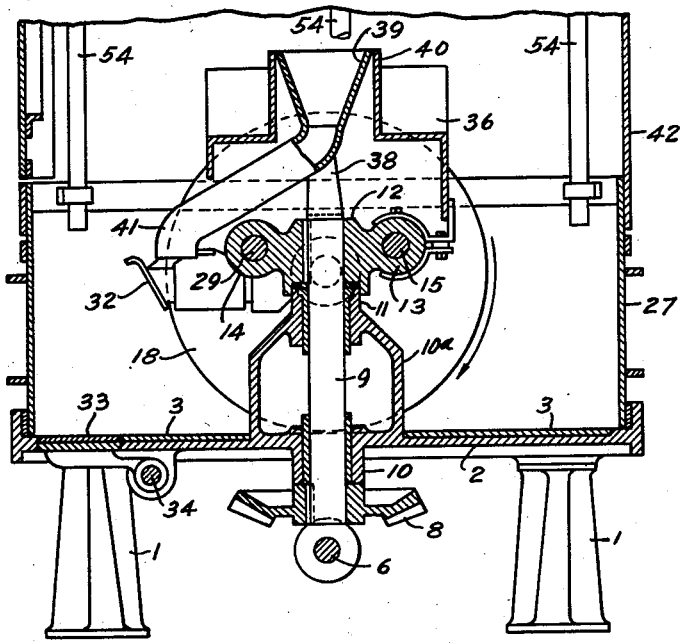
Figure 4 is a section on the line 4—4 of Figure 2, looking in the direction of the arrows.
Figure 5:
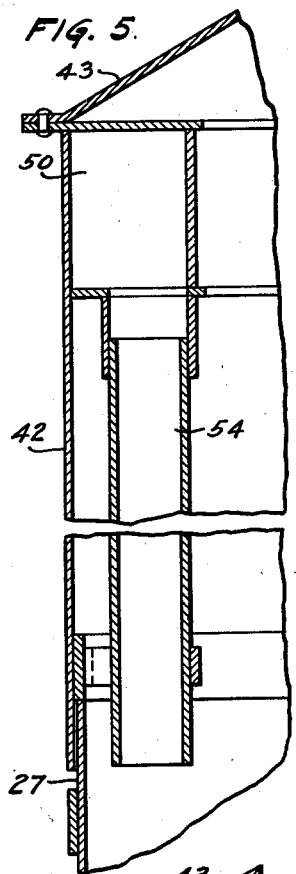
Figure 5 is a section along the line 5—5, looking in the direction of the arrows, of Figure 3.
Figure 6:
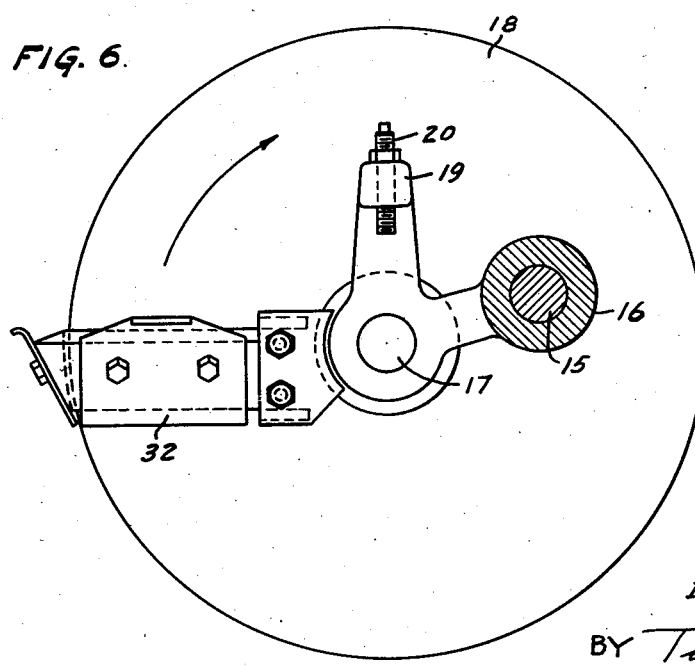
Figure 6 is a section on the line 6—6 of Figure 2, looking in the direction of the arrows.
Figure 7:
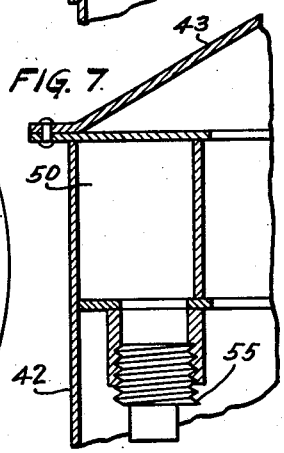
Figure 7 is a section on the line 7—7 of Figure 3, looking in the direction of the arrows.

Referring to the drawings in detail, 1 designates legs supporting the bottom 2 of a muller, upon which bottom are mounted wear plates 3. This bottom carries depending webs 4 having horizontal bearing sleeves 5 for supporting a horizontal driving shaft 6, on which is mounted a bevel pinion 7, which engages the bevel gear 8. This gear 8 is mounted on the bottom of the vertical driving shaft 9 which is journaled in the sleeve 10 formed in the bottom 2.

This bottom 2 also has formed an enlarged upwardly extending turret 10a, the upper end of which is constricted at 11 to form an upper bearing for the shaft 9. Mounted on the top of this shaft 9 is a spider or driving head 12. This head is provided with horizontally disposed sleeves 13 and 14. The sleeve 13 carries a transverse axle 15, on one end of which is mounted the muller arm 16, the free end of which carries a muller wheel axle 17, on which is mounted the muller wheel 18.

Figure 8:
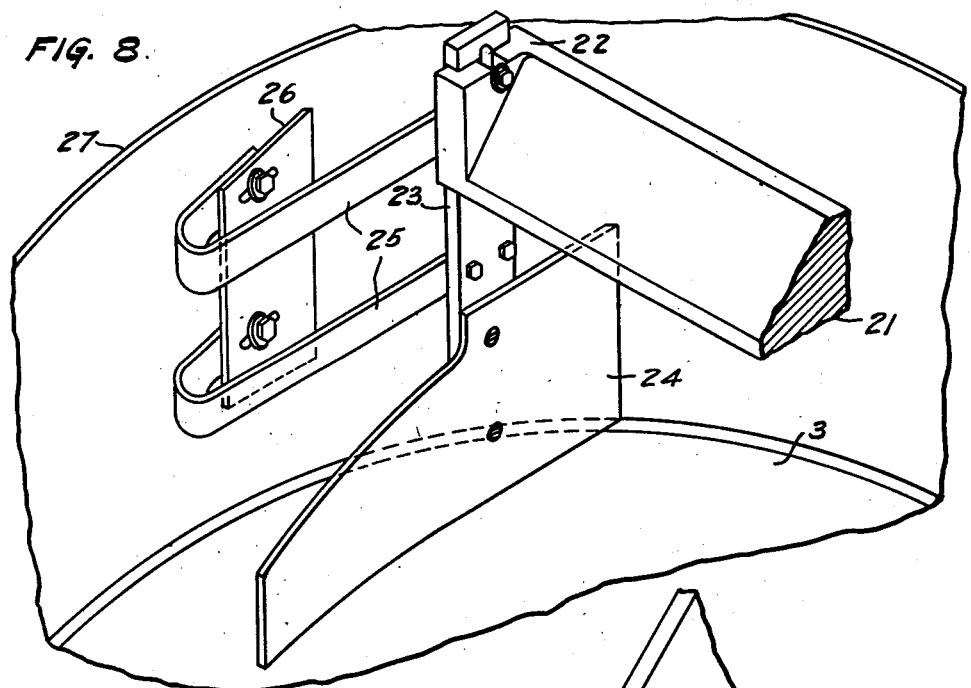
Figure 8 is a perspective of the outside plow and wall scraper, with the plow arm broken away in section.
Figure 9:
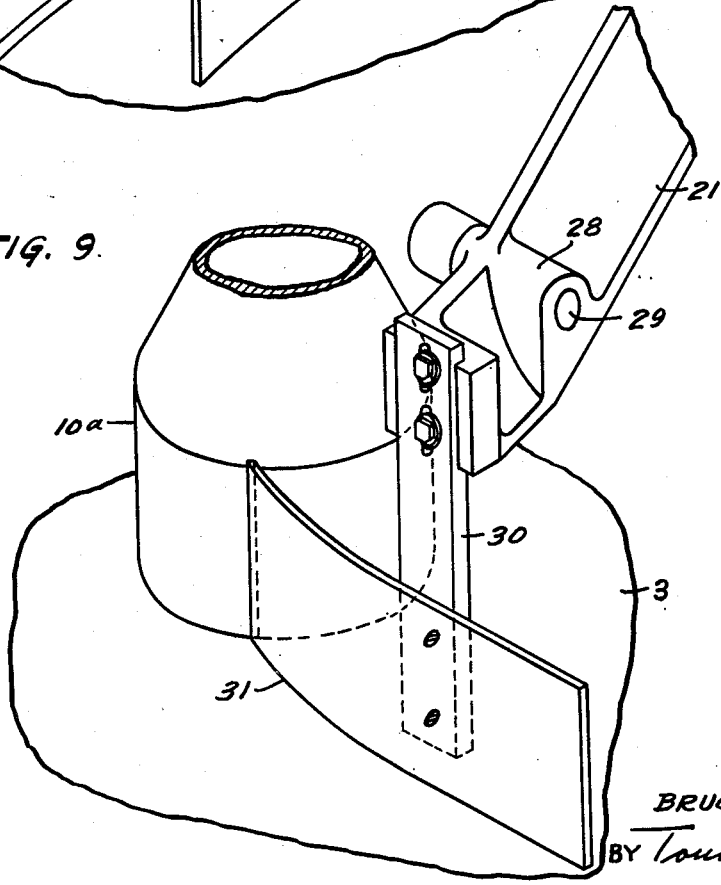
Figure 9 is a perspective of the inside plow with the turret broken away in section.

This arm 16 is provided with a bracket 19 having an adjustable set screw 20 that engages the top of the driving head 12 so that the distance of the muller wheel 18 above the wear plates 3 can be adjusted to give suitable mulling action. This axle 15 is also provided with a plow arm designated 21, the free end of which at 22 carries a vertical plow carrier 23. On the lower end of this carrier 23 is an outer plow 24. The arm 22 also carries arms 25 which support scrapers 26 that scrape the interior of the side wall 27 of the muller. The exact nature of these arms is not important, but may vary one from the other, as shown in Figures 2 and 8.

The other end of the arm 21 is provided with a sleeve 28, in which is mounted a stub axle 29 that is also supported by the sleeve 14. This arm has a vertical plow carrier 30 which suspends, at its lower end, an inner plow 31 that is closely adjacent to the turret 10a.

The muller wheel 18 is provided with a U-shaped scraper generally designated 32. This scraper is so arranged as to remove the adhering dry materials, liquids and pastes encountered in the mulling operation. The contents of the muller can be dumped through the trap door 33 which is mounted upon the shaft 34 that is actuated by the handle lever 35.

In order to introduce liquids, such as acids, there is provided a cover having a slanting top 36 and a flange 37. This cover is supported on the supports 38 on top of the spider 12. A funnel 39 is carried at the top of the tubular support 40 which forms a part of this cover. This funnel is provided with a laterally and downwardly extending spout 41 for delivering the acids between the plow 31 and the muller wheel 18.

It will be understood that one or more muller wheels may be employed.

The side walls 27 of the muller are provided with a superimposed side wall 42 which carries a conical cover 43, through which passes a delivery pipe 44 controlled by a valve 45. It is through this pipe that dry materials are introduced into the muller. The conical cover 43 is connected to an exhaust pipe 46 which is reduced at 47 to accelerate the flow of air and dust from within the muller. 47 is connected with the pipe 48 that is, in turn, connected to the discharge blower 49.

Returning again to the upper wall 42 of the housing over the muller, it will be observed that semi-circular chambers 50 are provided around the upper margin of this wall 42. These chambers communicate with the pressure pipe 51 controlled by a valve 52 which is connected to a pressure blower 53. Air under pressure is delivered at will to the semi-circular chambers 50 and thence downwardly through discharge pipes 54. Some of these pipes may be closed by plugs 55 to adjust the place and the amount of air delivered under pressure.

The method of this invention consists of the following steps. Not all of these steps are essential in any one operation, but they can be all used together conjointly and form a series of steps to produce the result of mulling finely divided materials, to which liquids must be added.

This method is particularly adaptable where very fine poisonous oxides that tend to float in the air must be mulled and where corrosive liquids such as sulphuric acid have to be added progressively to such finely divided oxides. This necessitates a method with a perfect control over the separate steps of the process.

The steps, therefore, consist of:

(a) Introducing finely divided materials of such fineness that they tend to float in the air;

(b) Spreading and mulling such materials within a closed container;

(c) Controlling the pressure conditions within the container so as to remove the fines that float, without causing the finely divided material to bodily leave the container;

(d) Introducing liquid while the mulling operation takes place;

(e) Controlling the temperature as well as the pressure or vacuum within the presence of the mulling operation by utilizing the air circulation and air pressure within the mulling chamber to regulate the temperature of the reaction of making the paste while it is being mulled; and (f) Carrying out simultaneously the mulling, plowing and liquid mixing so as to form a homogeneous paste of regulated porosity and uniformity, while at the same time controlling the heat of reaction and removing any floating surplus finely divided dry materials.

This method is particularly adapted to the manufacture of pastes for batteries made out of lead oxide and sulphuric acid. While the invention is not confined to any particular materials, yet the manufacture of such materials is illustrative of one manner of practicing the method of this invention. As illustrative of this process, the finely divided lead oxides are introduced upon opening the valve 45 through the pipe 44. The muller is started as these materials are introduced and the materials are spread evenly by the plows and muller wheels.

The blower 53 is shut down so that it acts as a brake upon the incoming air into the muller chamber. The service door or valve 45 is shut and the exhaust blower 49 is allowed to run normally. This creates a partial vacuum in the interior of the machine, allowing the finely divided material to settle on the floor of the machine while only those oxides which are suspended in the air and which must be carried off because of their danger to the operators are removed and collected elsewhere. As this goes on, the mulling mixer is started or has already been started so that the material is spread evenly throughout the floor of the muller.

At this point, moisture or acid is added and heat is developed from the reaction. It then becomes necessary to both exhaust, as heretofore described, and also to cool the material being mixed and to regulate the temperature of the mixture. Thereupon, the blower 53 is started which causes air to enter the distribution channels 50 and descends through the pipes 54. The air blows down through one or all of the numerous depending pipes 54 so that the air is forced into the mixture, across the mixture and thence upwardly in the center of the machine adjacent the turret, giving a complete or cup-shaped circulation. The action of the mullers serves to smooth down the paste while the plows turn it over with the cool air blowing over the new surface of the material, thus continually presented to the circulating cool air. This removes the heat which is transmitted to the air, and thence the hot air is taken out through the stack 46.

It will be understood that it is necessary in the case of battery pastes that they be so mixed that they are porous and that the porosity be uniform. This is one of the accomplishments of this method. The efficiency of a battery also depends upon the uniformity of the entire plate, because the greater the uniformity, the greater the assurance that the entire plate will be utilized and, therefore, the longer the life of the battery.

The method of this invention results in this even porosity because of the cooling action upon the paste. By utilizing the pressure and vacuum, the extraordinarily fine oxides are removed, leaving oxides of uniform weight and size so as to further enhance the uniformity and porosity of the resulting product. The method of this invention has resulted in a marked reduction in horsepower and a marked reduction in the time of the mixing cycle, and in an increase in reclaiming what is known as the "re-mix." The re-mix is the material left over after the pasting of the grids has taken place. A further object of this invention is to eliminate water jacketing which only gave cooling of the material by the adjacent jackets, whereas the method of controlling the heat of the present invention results in constantly cooling all surfaces of the material which are being constantly turned over and represented to the cool air. The method, therefore, consists in this particular in plowing and turning over the material, and causing it to incorporate by squeezing, rolling and mulling and by circulating the cool air over the surface of the material as it is turned over so that cool air is being constantly presented to a new, hot surface.

It will be understood that I desire to comprehend within my invention such modifications as come within the scope of the claims and the invention.

Having thus fully described my invention, what I claim as new and desire to secure by Letters Patent is:

1. A method of mixing battery paste comprising mulling and plowing finely divided lead oxide, introducing sulfuric acid thereto, continuing the mulling and plowing after the introduction of said acid to form a paste of said oxide and acid, and cooling the materials during said continued mulling and plowing to remove the heat of reaction therefrom by introducing cooling air into contact with the fresh surfaces of the materials continuously exposed by the mulling and plowing.

2. A method of mixing battery paste comprising mulling and plowing finely divided lead oxide, introducing sulfuric acid thereto, continuing the mulling and plowing after the introduction of said acid to form a paste of said oxide and acid, and cooling the materials during said continued mulling and plowing to remove the heat of reaction therefrom by introducing cooling air into contact with the fresh surfaces of the materials continuously exposed by the mulling and plowing.

3. A method of mixing battery paste comprising mulling a mixture of lead oxide and sulfuric acid in suitable proportions to form a paste, and removing the heat of reaction from the materials during said mulling by circulating cooling air into contact with the freshly exposed mulled surfaces of said materials and conveying the air away after it has taken up heat therefrom.

BRUCE L. SIMPSON.